United States Patent [19]
Liles

[11] Patent Number: 4,954,565
[45] Date of Patent: Sep. 4, 1990

[54] PRECURED SILICONE EMULSION

[75] Inventor: Donald T. Liles, Midland, Mich.

[73] Assignee: Dow Corning Corporation, Midland, Mich.

[21] Appl. No.: 411,800

[22] Filed: Sep. 25, 1989

[51] Int. Cl.⁵ .................................................. C08L 83/04
[52] U.S. Cl. ..................... 524/860; 524/588; 524/837; 524/869
[58] Field of Search ................. 524/588, 837, 860, 869

[56] References Cited

U.S. PATENT DOCUMENTS

| | | | |
|---|---|---|---|
| 2,891,920 | 6/1959 | Hyde et al. | 260/29.2 |
| 3,294,725 | 12/1966 | Findlay et al. | 260/29.2 |
| 3,355,406 | 11/1967 | Cekada | 260/29.2 |
| 4,100,124 | 7/1978 | Ichikawa et al. | 360/29.2 |
| 4,221,688 | 9/1980 | Johnson et al. | 260/29.2 |
| 4,427,811 | 1/1984 | Elias et al. | 524/96 |
| 4,496,687 | 1/1985 | Okada et al. | 524/837 |
| 4,584,341 | 4/1986 | Huebner et al. | 524/837 |
| 4,618,642 | 10/1986 | Schoenherr | 524/425 |

Primary Examiner—Melvyn I. Marquis
Assistant Examiner—Karen A. Hellender
Attorney, Agent, or Firm—Edward C. Elliott

[57] ABSTRACT

A shelf stable aqueous silicone emulsion which yields an elastomer upon removal of the water is produced by combining a hydroxyl endblocked polydiorganosiloxane present as an emulsion of dispersed particles in water, a crosslinker, and a tin catalyst, the tin catalyst being in the form of a divalent tin atom combined with organic radicals. The emulsion, after crosslinking of the polydiorganosiloxane, can be reinforced with colloidal silica without affecting the shelf life of the reinforced emulsion.

21 Claims, No Drawings

PRECURED SILICONE EMULSION

BACKGROUND OF THE INVENTION

1. Field of the Invention

This invention relates to an aqueous silicone emulsion which gives a silicone elastomer upon removal of the water under ambient conditions.

2. Background Information

A silicone rubber latex reinforced with silsesquioxane is taught in U.S. Pat. No. 3,355,406, issued Nov. 28, 1967, by Cekada. He teaches a latex containing a curable, essentially linear silicone polymer, preferably a hydroxy or alkoxy endblocked linear polymer having been prepared by emulsion polymerization, a crosslinking agent which is a trifunctional or tetrafunctional silane, preferably trialkoxysilane, and a catalyst. Included in the catalysts are dialkyltindiacylates.

Ichikawa, et al. describe silicone compositions which are useful as binders for fibrous gasketing and packing materials in U.S. Pat. No. 4,100,124, issued Jul. 11, 1978. The compositions are a mixture of hydroxyl endblocked diorganosiloxanes, a crosslinking trialkoxysilane, catalyst, emulsifier, and water.

Johnson et al. describe in U.S. Pat. No. 4,221,688, issued Sept. 9, 1980, a silicone emulsion which provides an elastomeric product and methods for it's preparation. The emulsion comprises a continuous aqueous phase and a dispersed phase, the dispersed phase consisting essentially of an anionically stabilized hydroxylated polydiorganosiloxane which contains about 2 silicon-bonded hydroxyls per molecule, an organic tin compound, and a colloidal silica, the emulsion having a pH in the range of 9 to 11.5 inclusive. Experience with such emulsions has now shown that there is a problem with the shelf life of the emulsion, which is manifested by a change in properties of the elastomer obtained upon drying as the emulsion ages; and, in addition, a change in properties upon aging of the elastomer produced by the removal of water from the emulsion.

A silicone elastomeric emulsion having improved shelf life is taught by Elias and Freiberg in U.S. Pat. No. 4,427,811, issued Jan. 24, 1984. The emulsion is produced by a method which first mixes an anionically stabilized, hydroxyl endblocked polydiorganosiloxane, colloidal silica, and an alkyl tin salt, then ages the mixture for at least two weeks at room temperature, then adds filler other than colloidal silica. The alkyl tin salt is preferably a dialkyltindicarboxylate.

A different type of aqueous emulsion is taught in U.S. Pat. No. 4,618,642, issued Oct. 21, 1986, by Schoenherr. This composition consists essentially of an anionically stabilized, hydroxyl endblocked polydiorganosiloxane, a dialkyltindicarboxylate, a trifunctional silane crosslinking agent, and a non-siliceous, inert filler. The filler is nonsiliceous since the shelf life will be affected if a silica filler is present because the composition still contains the hydroxylated polydiorganosiloxane and organic tin compound as found in Johnson et al.

SUMMARY OF THE INVENTION

This invention encompasses a process for producing an aqueous silicone emulsion which gives an elastomer upon removal of the water which can be reinforced with a silica filler and still retain it's properties upon aging, the shelf stable aqueous silicone emulsion resulting from the process, and the elastomer produced by removal of the water from the emulsion. The process combines an anionically stabilized, hydroxyl endblocked polydiorganosiloxane; crosslinker selected from the group consisting of silane (a) of the formula $R_aSi(OR')_{4-a}$ where R is hydrogen, monovalent hydrocarbon radical or substituted hydrocarbon radical of from 1 to 6 carbon atoms inclusive, functionalized hydrocarbon radicals, or amine containing radicals, with the proviso that R be chosen such that the crosslinker must be capable of migrating from the aqueous phase into the emulsion micelle of (1), R' is a lower alkyl radical of from 1 to 6 carbon atoms inclusive or a radical of the formula $-N=CR''_2$ where R'' is hydrogen or monovalent hydrocarbon radical of from 1 to 6 carbon atoms inclusive, a is 0 or 1, (b) siloxane having at least 3 reactive groups bonded to silicon per molecule, the reactive group being selected from the group consisting of hydrogen and reactive group of the formula OR' where R' is as defined above, and (c) silazane of the formula $R_aSi(NR''_2)_{4-a}$ where R, R'', and a are as defined above; and a tin (II) catalyst, such as stannous octoate. The emulsion can be reinforced with colloidal silica, without loss of shelf life. The use of the divalent tin (II) as catalyst is a crucial part of the invention.

DESCRIPTION OF THE INVENTION

This invention relates to an aqueous silicone emulsion having an improved shelf life and which yields an elastomer upon removal of the water at ambient conditions comprising (1) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical or 2-(perfluoroalkyl)ethyl radicals having less than 7 carbon atoms per radical, present as an emulsion of dispersed particles in water, the emulsion having a pH of from 4 to 10.5; (2) from 0.1 to 1.0 parts by weight of tin (II) (stannous) catalyst; (3) from 0.1 to 5 parts by weight of crosslinker selected from the group consisting of (a) silane of the formula $R_aSi(OR')_{4-a}$ where R is hydrogen, monovalent hydrocarbon radical or substituted hydrocarbon radical of from 1 to 6 carbon atoms inclusive, functionalized hydrocarbon radicals, or amine containing radicals, with the proviso that R be chosen such that the crosslinker must be capable of migrating from the aqueous phase into the emulsion micelle of (1), R' is a lower alkyl radical of from 1 to 6 carbon atoms inclusive or a radical of the formula $-N=CR''_2$ where R'' is hydrogen or monovalent hydrocarbon radical of from 1 to 6 carbon atoms inclusive, a is 0 or 1; (b) siloxane having at least 3 reactive groups bonded to silicon per molecule, the reactive group being selected from the group consisting of hydrogen, reactive group of the formula OR' where R' is as defined above, and an amine radical of the formula $-NR''_2$ where R'' is as defined above; and (c) silazane of the formula $R_aSi(NR''_2)_{4-a}$ where R, R'', and a are as defined above, and (4) colloidal silica reinforcement; the emulsion being able to be reinforced with colloidal silica without loss of shelf life, and yielding an elastomer upon removal of the water.

This invention relates to a process for producing an aqueous silicone emulsion having improved shelf life and which yields an elastomer upon removal of the water at ambient conditions consisting essentially of (A) mixing (1) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical or 2-(perfluoroalkyl)ethyl radicals having less than 7 carbon atoms per radical, present as an emulsion of dispersed particles in water, the emulsion having a pH of from 4 to 10.5, (2) from 0.1 to 1.0 parts by weight of tin (II) (stannous) catalyst, (3) from 0.1 to 5 parts by weight of crosslinker selected from the group consisting of (a) silane of the formula $R_aSi(OR')_{4-a}$ where R is hydrogen, monovalent hydrocarbon radical or substituted hydrocarbon radical of from 1 to 6 carbon atoms inclusive, functionalized hydrocarbon radicals, or amine containing radicals, with the proviso that R be chosen such that the crosslinker must be capable of migrating from the aqueous phase into the emulsion micelle of (1), R' is a lower alkyl radical of from 1 to 6 carbon atoms inclusive or a radical of the formula —N=CR''$_2$ where R'' is hydrogen or monovalent hydrocarbon radical of from 1 to 6 carbon atoms inclusive, a is 0 or 1; (b) siloxane having at least 3 reactive groups bonded to silicon per molecule, the reactive group being selected from the group consisting of hydrogen, reactive group of the formula OR' where R' is as defined above, and an amine radical of the formula —NR''$_2$ where R'' is as defined above; and (c) silazane of the formula $R_aSi(NR''_2)_{4-a}$ where R, R'', and a are as defined above; the tin (II) catalyst being added before or simultaneously with the crosslinker, (B) aging at room temperature for sufficient time to allow crosslinking of the polydiorganosiloxane, then (C) raising the pH of the emulsion to greater than 11 to destroy the activity of the catalyst, to give an emulsion of a polydiorganosiloxane which yields an elastomer upon removal of the water, and which can be reinforced with colloidal silica without loss of shelf life.

Hydroxyl endblocked polydiorganosiloxane in emulsion form can be crosslinked to form what is known in the art as precrosslinked or precured silicone emulsions. Removal of water from these precured emulsions produces silicone elastomers. The precured silicone elastomer emulsions described by Johnson et al. in U.S. Pat. No. 4,221,688, are of this type. The useful life (shelf life) of the emulsions of Johnson et al. is limited due to a reaction of the hydroxyl endblocked polydiorganosiloxane and the silica filler in the presence of tetrafunctional tin catalyst. This invention encompasses a process for producing an aqueous silicone emulsion that is precured, but has improved shelf life. Crosslinking is accomplished in the emulsion by reaction of the hydroxyl endblocked polydiorganosiloxane and the crosslinker in the presence of a divalent tin (tin (II)) catalyst.

The anionically stabilized, hydroxyl endblocked polydiorganosiloxane used in this invention is now well known in the art. The hydroxyl endblocked polydiorganosiloxane (A) is one which can be emulsified, and when crosslinked imparts elastomeric properties to the product obtained after the removal of the water from the emulsion, and which is anionically stabilized. Tensile strengths and elongations at break improve with increasing weight average molecular weight (Mw), with suitable tensile strengths and elongations obtained above 50,000 Mw. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred Mw for the hydroxyl endblocked polydiorganosiloxanes are in the range of 200,000 to 700,000. The organic radicals of the hydroxyl endblocked polydiorganosiloxane can be monovalent hydrocarbon radicals containing less than seven carbon atoms per radical and 2-(per-fluoroalkyl)ethyl radicals including 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom but may include trace amounts of monoorganosiloxane or triorganosiloxy units present as impurities of the manufacturing process. The preferred hydroxyl endblocked polydiorganosiloxanes are the hydroxyl endblocked polydimethylsiloxanes. The preferred anionically stabilized, hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued Jun. 23, 1959, which is hereby incorporated by reference to show the hydroxyl endblocked polydiorganosiloxanes, the ingredients used, and their method of preparation. These methods and others are known in the art.

The hydroxyl endblocked polydiorganosiloxanes used in this invention are those which are anionically stabilized. For the purpose of this invention "anionically stabilized" means the hydroxyl endblocked polydiorganosiloxane is stabilized in emulsion with an anionic surfactant. An anionic surfactant is a surface active material consisting of a hydrophobic segment joined to a hydrophilic segment. The hydrophilic segment is an anion such as a sulphate, sulfonate, or phosphate. The hydrophobic segment is a long chain linear or branched hydrocarbon radical such as octadecyl or dodecyl. The anion portion is balanced by a cation such as sodium. This silicone emulsion is in the form of an oil-in-water emulsion, i.e., the polydiorganosiloxane is a dispersed phase of particles in a continuous phase of water.

The shelf stability of the aqueous silicone emulsion of this invention is the result of the use of divalent tin as the tin catalyst, rather than the tetravalent tin which has been used in the past in aqueous silicone emulsions of this type. The divalent, stannous form of tin does not cause a reaction between the hydroxyl endblocked polydiorganosiloxane and silica as is caused when the tetravalent, stannic form of tin is used as the catalyst. Therefore, when stannous catalyst is combined with hydroxyl endblocked polydiorganosiloxane and the crosslinker of this invention, crosslinking occurs readily; and the crosslinked polymer in emulsion can be reinforced with silica without a loss of shelf life. It is desirable that the tin (II) (stannous) catalyst be compatible in the polymer. The tin (II) (stannous) catalyst used in this invention can be any of the organic stannous carboxylates, such as stannous oleate, stannous neodecanoate, or stannous octoate. The preferred stannous catalyst is stannous octoate (stannous bis(2-ethylhexanoate)).

The polydiorganosiloxane in the emulsion of this invention is crosslinked by the use of a crosslinker selected from the group consisting of (a) silane of the formula $R_aSi(OR')_{4-a}$ where R is hydrogen, monovalent hydrocarbon radical or substituted hydrocarbon radical of from 1 to 6 carbon atoms inclusive, functionalized hydrocarbon radicals, or amine containing radicals, with the proviso that R be chosen such that the crosslinker must be capable of migrating from the aqueous phase into the emulsion micelle of (1), R' is a lower alkyl radical of from 1 to 6 carbon atoms inclusive or a radical of the formula $-N=CR''_2$ where R'' is hydrogen or monovalent hydrocarbon radical of from 1 to 6 carbon atoms inclusive, a is 0 or 1; (b) siloxane having at least 3 reactive groups bonded to silicon per molecule, the reactive group being selected from the group consisting of hydrogen, reactive group of the formula OR' where R' is as defined above, and an amine radical of the formula $-NR''_2$ where R'' is as defined above; and (c) silazane of the formula $R_aSi(NR''_2)_{4-a}$ where R, R'', and a are as defined above. The crosslinker must be capable of migrating from the aqueous phase into the emulsion micelle of (1). Whether or not crosslinkers will adaquately perform in the process of this invention is determined experimentally. Crosslinker and tin (II) catalyst are added with stirring to a sample of the hydroxyl endblocked polydiorganosiloxane emulsion and the mixture is allowed to remain undisturbed for 24 hours to complete the crosslinking process. Usually 1 percent crosslinker and 0.5 percent tin (II) catalyst (based upon polymer weight) are sufficient. After crosslinking, films of the emulsion are cast, and after drying, they are examined. If the films are tack free and elastomeric, the crosslinker is suitable; but if they are non-elastic, the crosslinker is unsuitable. If they are slightly elastomeric and tacky, crosslinking occured to some extent, the crosslinker may be suitable if more is used. For example, silanes of the formula $(CH_3O)_3SiCH_2CH_2NH_2$ or $(CH_3O)_3Si(CH_2)_3NH(CH_2)_2NH_2$ did not function due to the fact that they remained in the aqueous phase when added to the emulsion and did not migrate into the micelle so that the reaction with the hydroxyl endblocked polymer could take place. Other crosslinkers which were found unsuitable included $(CH_3O)_3Si(CH_2)_2C_6H_4SO_2N_3$ and $(CH_3CH_2O)_3Si(CH_2)_3N=C=O$. A silane of the formula $(CH_3O)_3SiCH_2CH_2NHC_6H_5$ did provide a crosslinked emulsion polymer since this silane does migrate into the micelle.

R can be hydrogen; a monovalent hydrocarbon radical or substituted hydrocarbon radical such as an alkyl radical, for example methyl, ethyl, propyl, isopropyl, and butyl, an alkenyl radical such as vinyl or allyl, a halogenated hydrocarbon such as chloropropyl or trifluoropropyl, an aryl radical such as phenyl, functionalized hydrocarbon radicals such as glycidoxy, acryl or methacryl, and mercapto, and amine containing radicals such as phenylaminopropyl but not aminopropyl or aminoethylaminopropyl for the reasons given above. R' is chosen from methyl, ethyl, propyl, isopropyl, and butyl. Suitable silanes include ethylorthosilicate, normal propylorthosilicate, mercaptopropyltrimethoxysilane, methyltrimethoxysilane, phenyltrimethoxysilane, chloropropyltrimethoxysilane, trifluoropropyltrimethoxysilane, ethyltrimethoxysilane, triethoxysilane, and vinyltrimethoxysilane. Preferred silanes are vinyltrimethoxysilane and normal propylorthosilicate.

The crosslinker can also be a ketoxime functional silane where the functional radical is of the formula $-O-N=CR''_2$, where R'' is hydrogen or monovalent hydrocarbon radical of from 1 to 6 carbon atoms inclusive. Examples of such silanes include methyltris(methylethylketoxime)silane, methyltris(dimethylketoxime)silane, methyltris(diethylketoxime)silane, and vinyltris(methylethylketoxime)silane. A preferred ketoximo silane is methyltris(methylethylketoxime)silane.

The crosslinker can also be a siloxane having at least 3 reactive groups bonded to silicon per molecule, the reactive group being selected from the group consisting of hydrogen, OR' where R' is a lower alkyl radical of from 1 to 4 carbon atoms inclusive, ketoximo radicals of the formula $-O-N=CR''_2$, and an amine radical of the formula $-NR''_2$. Such crosslinkers are illustrated by low molecular weight organosilicon hydrides such as polymethylhydrogensiloxane, low molecular weight copolymers containing methylhydrogensiloxy and dimethylsiloxy groups, $-(OSi(OEt)_2)-$, (ethylpolysilicate), $(OSiMeC_2H_4Si(OMe)_3)_4$, and $(OSiMeON=CR''_2)_4$, where Me is methyl radical and Et is ethyl radical. Silicon compounds other than siloxanes having at least 3 reactive groups per molecule, such as $(MeO)_3SiC_2H_4Si(OMe)_3$ are also suitable, as long as they move from the aqueous phase into the micelle so that they can react with the polymer. It is believed that the non-reactive radicals in the siloxane can be any group as long as it does not inhibit the migration of the siloxane crosslinker into the micelle.

The crosslinked emulsion produced by the method of claim 15 can be reinforced and/or extended through the addition of filler. Any of the common fillers which do not react with the emulsion are suitable. Inert fillers suitable for use in anionic silicone emulsions are well known. The fillers have an average particle size below 10 micrometers, preferably below 2 micrometers. Examples of fillers include carbon blacks, titanium dioxide, aluminum oxide, calcium carbonate, zinc oxide, mica, and various pigments. Titanium oxide has been found to be particularly useful as an ultraviolet light screening agent. The crosslinked emulsion of this invention is particularly useful because it can be reinforced with colloidal silica. Although the common fumed silica can be used as reinforcement, preferred is a colloidal silica dispersion. There are commercially available aqueous dispersions of fumed colloidal silica. A preferred silica dispersion is a sol of colloidal silica such as the commercially available Nalcoag (R) silicas from Nalco Chemical Company.

The process of this invention begins by mixing the emulsion of hydroxyl endblocked polydiorganosiloxane (1), tin (II) catalyst (2), and crosslinker (3). For each 100 parts by weight of hydroxyl endblocked polydiorganosiloxane, there is from 0.1 to 1.0 parts by weight of tin (II) catalyst. The amount of tin catalyst used has an effect upon how long it takes for the polydiorganosiloxane in the emulsion to react with the crosslinker to provide a crosslinked polymer within the emulsion micelles. A preferred amount of tin (II) catalyst is from 0.25 to 1.0 parts by weight. The crosslinker is present in an amount from 0.1 to 5 parts by weight. The rate of crosslinking and the modulus of the crosslinked elastomer formed by drying the emulsion can be varied by varying the amount of crosslinker used. As more crosslinker is used, the modulus is raised. It is not necessary to add more crosslinker than is required to react with the hydroxyl present on the polydiorganosiloxane. A preferred amount of crosslinker is from 0.5 to 2 parts by weight. When the crosslinker is a tetrafunctional material, a is 0, while a is 1 for a trifunctional crosslinker. During the process of mixing, preferably, the tin (II) catalyst is added to the emulsion of polydiorganosiloxane first, followed by the crosslinker. The order of mixing is not critical as the crosslinker can be added first, followed by the catalyst, or the crosslinker and catalyst can be mixed together and then added to the polydiorganosiloxane emulsion, as long as there is no delay between the additions. As soon as the ingredients are mixed, the reaction between the hydroxyl endblocked polydiorganosiloxane and the crosslinker will begin, resulting in the production of crosslinked polymer. The reaction is allowed to proceed until the emulsion gives an elastomer upon removal of the water. This point can be monitored by simply testing a portion of the mixture during the crosslinking process. The pH of the emulsion during crosslinking should be between 4 and 10.5, the preferred range being between 5 and 10.5. Outside of this range, crosslinking does not occur; presumably due to hydrolysis of both the crosslinker and the catalyst. Different crosslinkers give different rates of reaction. For example, vinyltrimethoxysilane required approximately ½ hour to crosslink, while normal orthopropylsilicate required approximately 2 hours to complete the crosslinking process. In both cases the tin II level was at 0.5 pph. If the crosslinked emulsion is then allowed to shelf age, the catalyst will gradually become inactive, due to hydrolysis. The rate of hydrolysis of the catalyst is dependant upon the pH of the emulsion. It is preferred that the pH of the emulsion be raised to greater than 11, at which point the catalyst hydrolyzes quickly and is no longer active. It is preferred that the emulsion be at a pH of from 5 to 10.5 during the crosslinking step. Once the catalyst is inactivated, the pH can be adjusted to any desired level. However, if the pH is lower than 3, polymerization will begin again.

At this point in the process, the emulsion can be used to give a coating of a crosslinked polydiorganosiloxane. Such an emulsion could be used for the treatment of paper or fabrics; for example, by coating the substrate, then removing the water.

Because the tin (II) catalyst is no longer active, the emulsion can be reinforced with colloidal silica, without causing shelf life problems. The colloidal silica is added to the emulsion after it is crosslinked and the catalyst is inactivated. If the silica is present before the polydiorganosiloxane is crosslinked, the tin (II) catalyst will not catalyze the reaction and the polydiorganosiloxane will not properly crosslink. It is preferred that colloidal silica used for reinforcement be in the form of a suspension and that the pH of the colloidal silica suspension be about that of the crosslinked polydiorganosiloxane emulsion to which it is being added.

Extending filler can also be added to the crosslinked emulsion. Extending fillers are used to provide opacity, color, higher specific gravity, and reduced cost.

Additional ingredients which can be added to the composition include such things as antifoam to aid during the mixing process, stabilizers such as organic amines, preferably 2-amino-2-methyl-1-propanol, and pigments such as titanium dioxide and carbon black to provide opaqueness or color to the composition.

The emulsions of this invention can be used as coatings, and when filled to give a paste consistency, as sealants and adhesives. When the emulsions of this invention are dried by removal of the water, an elastomer results. Because colloidal silica can be used as a reinforcement without problems of shelf life or useful life, excellent physical properties for the elastomer are possible, regardless of the age of the emulsion.

The following examples are included for illustrative purposes only and should not be construed as limiting the invention which is properly set forth in the appended claims.

EXAMPLE 1

To 200 g of an anionically emulsified polydimethylsiloxane emulsion having a solids content of about 70 percent by weight, the emulsion particles being less than 0.6 micrometers in average diameter and the polymer having a molecular weight average of greater than 240,000, and having a pH of 10.3, was added 0.35 g of stannous octoate (stannous bis(2-ethylhexanoate)) and the emulsion was stirred for 5 minutes. Next, 1.05 g of vinyltrimethoxysilane (VTM) was added dropwise to the emulsion with stirring. Following addition of VTM, the emulsion was stirred an additional 3 minutes, the container (one pint jar) was capped and the emulsion was allowed to remain undisturbed at room temperature for 1 hour. Following this period, the emulsion was again stirred while 5 g of 2-amino-2-methyl-1-propanol (AMP) was added dropwise. After all of the AMP was added, stirring was continued while 93 g of a 15 percent solids (by weight) sol of colloidal silica (Nalcoag (R) 1115) was slowly added to the emulsion in a thin stream. Following addition of the colloidal silica, several drops of an antifoam, Nalco 2311, were added. Stirring was stopped and a portion of the emulsion was transferred to several 2 ounce vials which were then centrifuged lightly to exclude air bubbles in the emulsion. Emulsion was poured into several 100 mm diameter Petri dishes (8 g emulsion per dish) and the dishes were left uncovered and undisturbed for 24 hours. The resulting films were elastomeric and after 1 week of aging, mechanical properties were determined: 350 psi ultimate tensile strength, 1000% ultimate elongation. The total solids content of this emulsion was approximately 50 percent by weight. It consisted of a precured emulsion containing 10 parts of silica per 100 parts of polymer (10 pph silica). In addition, it contained 0.25 pph tin (II) catalyst and 0.75 pph VTM, both based on polymer weight.

EXAMPLE 2

Either 2 normal HCl or 20 percent aqueous diethylamine was added to the anionically emulsified polydimethylsiloxane emulsion of Example 1 so as to produce a series of 7 emulsions having a pH range of between 2.6 to 11.0 inclusive. Each emulsion polymer was crosslinked by adding 0.25 pph VTM and 0.75 pph stannous octoate (both based on polymer by weight) following the procedure of example 1. Next, each emulsion was filled with 10 pph (solids, based on polymer weight) Nalcoag (R) 1115 colloidal silica and films were cast into Petri dishes, also following the procedure of example 1. After aging the films for 1 week, mechanical properties were determined, the results are presented in Table I.

TALBE I

| pH | Tensile Strength |
|---|---|
| 2.6 | no cure |
| 3.1 | no cure |
| 4.6 | 260 psi |
| 6.8 | 280 psi |

TALBE I-continued

| pH | Tensile Strength |
| --- | --- |
| 9.1 | 250 psi |
| 10.3 | 290 psi |
| 11.0 | no cure |

EXAMPLE 3

A series of emulsion polymers was prepared using a procedure similar to that of example 1 except that VTM, the crosslinker, was added to the emulsion before the addition of tin catalyst. In this series, time between addition of crosslinker and catalyst was varied from zero (both VTM and catalyst were mixed together before addition to emulsion) to 60 minutes. In all of the samples, crosslinker and catalyst were added dropwise to the emulsion with stirring. After addition of catalyst, each emulsion was stirred for 5 minutes longer, allowed to stand undisturbed for 1 hour and filled with 10 pph Nalco 1115 colloidal silica as described in Example 1. Also using the procedure of Example 1, films from each emulsion were cast, aged for 4 days and mechanical properties were determined, the results are given in Table II. Composition of these emulsions was the same as the one described in Example 1.

TABLE II

| Time Between Addition of VTM & Sn (II) octoate | Tensile Strength |
| --- | --- |
| 0 | 240 psi |
| 1 minute | 260 psi |
| 15 minutes | no cure |
| 30 minutes | no cure |
| 60 minutes | no cure |

The same experiment was repeated except that tin catalyst was added to the emulsions prior to addition of crosslinker. Composition of these emulsion was the same as those in Table II. Results of this are given in Table III.

TABLE III

| Time between Addition of Sn (II) octoate & VTM | Tensile Strength |
| --- | --- |
| 0 | 240 psi |
| 1 minute | 250 psi |
| 15 minutes | 255 psi |
| 30 minutes | 250 psi |

Another series of emulsions was prepared using a procedure similar to the one of Example 1. In this series, time allowed for crosslinking was varied. Crosslinking was terminated by raising pH of the emulsions to 11-12 by addition of 2-amino-2-methyl-1-propanol (AMP). Thus the same procedure as that of Example 1 was used to prepare this series of emulsions except that the time between addition of VTM and AMP was changed. Results from this series are given in table IV. Composition of emulsions in Table IV are the same as those in Tables I, II, and III and Example 1.

TABLE IV

| Time for X-linking (time) between VTM & AMP addition) | Tensile Strength | Elongation |
| --- | --- | --- |
| 5 minutes | no cure | |
| 30 minutes | 295 psi | 1200% |
| 1 hour | 305 psi | 1080% |
| 2 hour | 290 psi | 980% |
| 3 hour | 310 psi | 970% |
| 20 hour | 280 psi | 1000% |

EXAMPLE 4

A series of emulsions was prepared using the same procedure as that described in example 1, except the amount of crosslinker, VTM, was changed. Elastomeric films were prepared also according to the procedure of Example 1 and their mechanical properties were determined, see Table V. Excluding the amount of VTM, composition of emulsions used to prepare elastomers in Table V was the same as the emulsion of Example 1.

TABLE V

| VTM (pph based on polymer, by wt.) | Tensile Strength | Elongation |
| --- | --- | --- |
| 0.25 | 120 psi | 400% |
| 0.50 | 300 psi | 620% |
| 0.75 | 380 psi | 920% |

Another series of emulsions was prepared, also using the procedure described in Example 1. In this case, the crosslinker was a mixture of VTM and its partial hydrolysis products. Crosslinker consisted of approximately 50 percent VTM; the remainder was a mixture of siloxanes such as divinyltetramethoxydisiloxane, trivinylpentamethoxytrisiloxane and higher homologs up to and including the pentasiloxane. In this series, composition of the emulsions was the same as the emulsion of Example 1 except for the amount and type of crosslinker and the amount of colloidal silica. Elastomeric films from these emulsions were prepared using the procedure of Example 1 and their mechanical properties were determined. The results are summarized in Table VI.

TABLE VI

| VTM (pph) | Nalco 1115 (pph) | Tensile Strength | Elongation |
| --- | --- | --- | --- |
| 0.25 | 10 | 300 psi | 1000% |
| 0.125 | 15 | (no cure) <30 psi | <50% |
| 0.25 | 15 | 390 psi | 970% |
| 0.375 | 15 | 370 psi | 950% |
| 0.50 | 15 | 315 psi | 720% |
| 0.75 | 15 | 325 psi | 650% |

EXAMPLE 5

Following the procedure of example 1, a series of emulsions was prepared using various alkoxysilanes as crosslinker. Except for the crosslinker, emulsions in this series had the same composition as the emulsion of Example 1. Mechanical properties of elastomers derived from these emulsions are given in Table VII.

TABLE VII

| Crosslinker | | | Tensile Strength | Elongation |
| --- | --- | --- | --- | --- |
| 2 | pph | A | 250 psi | 520% |
| 2 | pph | B | 290 psi | 620% |
| 1 | pph | C | 210 psi | 380% |
| 1 | pph | D | 300 psi | 450% |
| 0.5 | pph | D | 270 psi | 570% |
| 0.5 | pph | E | 230 psi | 470% |
| 0.75 | pph | E | 200 psi | 440% |
| 1.0 | pph | E | 200 psi | 400% |
| 2.0 | pph | E | 290 psi | 540% |
| 0.75 | pph | F | 380 psi | 920% |

TABLE VII-continued

| Crosslinker | | | Tensile Strength | Elongation |
|---|---|---|---|---|
| 2.0 | pph | G | 600 psi | 910% |

A = Si(OEt)⁴ (EOS)
B = -(OSi(OEt)2)- (EPS)
C = (OSiMeC2H4Si(OMe)3)4
D = (MeO)3SiC2H4Si(OMe)3
E = MeSi(OMe)3 (MTM)
F = CH2CHSi(OMe)3 (VTM)
G = Si(OC3H7)4 (NPOS)

EXAMPLE 6

To 1 kilogram of the anionically emulsified polydimethylsiloxane emulsion of Example 1 in a one-half gallon jar was added dropwise with stirring enough 2 normal HCl to lower the pH of the emulsion to between 5 to 8. Next stirring was continued while 5.52 g of VTM was added dropwise to the emulsion. After stirring for 5 minutes, 3.5 g of stannous octotate was added dropwise to the emulsion, also with stirring. After addition of tin catalyst was complete, the emulsion was stirred for 5 minutes longer, the container was capped and the emulsion was allowed to remain undisturbed for 16 hours at room temperature. Next, the emulsion was stirred while 20 g of AMP was added dropwise. Two 100 g portions of the crosslinked emulsion polymer were transferred to smaller containers and to one of them was added, with stirring, 21 g of Nalcoag (R) 1050 colloidal silica, a 50 percent solids (by weight) sol of colloidal silica. To the other emulsion was added, also with stirring, 58.3 g of Cabosperse (R) SC-2. an aqueous, dispersed, fumed silica. These two samples consisted of emulsion polymer, 0.75 pph VTM, 0.5 pph Sn (II) catalyst and 15 pph silica. Two more emulsions were prepared that had compositions corresponding to the above described emulsions except that a Sn (IV) catalyst was used in place of the Sn (II) catalyst: To 500 g of the anionically emulsified polydimethylsiloxane emulsion of Example 1 was added dropwise with stirring, 2.63 g of VTM followed by 3.5 g of 50 percent solids by weight emulsion of dioctyltindilaurate (Sn(IV) catalyst), also with stirring. Stirring was continued while 10 g of AMP was added dropwise after which stirring was stopped, the container was closed and the emulsion was allowed to remain undisturbed for 72 hours at room temperature. Next the emulsion was divided into two 200 g portions and to one, 42 g of Nalcoag (R) 1050 colloidal silica was added with stirring and to the other, 117 g of Cabosperse (R) SC-2 aqueous, dispersed, fumed silica was added, also with stirring. These two samples consisted of emulsion polymer, 0.75 pph VTM, 0.5 pph Sn(IV) catalyst and 15 pph silica.

Elastomeric films were made from these four emulsions using the procedure described in Example 1 and their mechanical properties were determined. The emulsions were stored in closed containers and periodically, samples were removed, elastomeric films were cast and their mechanical properties were determined. The results are given in Table VIII.

TABLE VIII

| Shelf Age | | Catalyst | Silica | Tensile psi | Elongation percent |
|---|---|---|---|---|---|
| 0 | | Sn (II) | Nalco 1050 | 100 | 850 |
| 1.5 | mo | Sn (II) | Nalco 1050 | 110 | 1050 |
| 2 | mo | Sn (II) | Nalco 1050 | 105 | 1030 |
| 3 | mo | Sn (II) | Nalco 1050 | 110 | 1100 |
| 6 | mo | Sn (II) | Nalco 1050 | 110 | 1070 |
| 0 | | Sn (IV) | Nalco 1050 | 100 | 670 |
| 1.5 | mo | Sn (IV) | Nalco 1050 | 80 | 560 |
| 2 | mo | Sn (IV) | Nalco 1050 | 70 | 520 |
| 3 | mo | Sn (IV) | Nalco 1050 | 65 | 400 |
| 5 | mo | Sn (IV) | Nalco 1050 | 60 | 290 |
| 6 | mo | Sn (IV) | Nalco 1050 | 55 | 230 |
| 0 | | Sn (II) | Cabot SC-2 | 190 | 600 |
| 1.5 | mo | Sn (II) | Cabot SC-2 | 190 | 600 |
| 2 | mo | Sn (II) | Cabot SC-2 | 185 | 810 |
| 3 | mo | Sn (II) | Cabot SC-2 | 190 | 820 |
| 6 | mo | Sn (II) | Cabot SC-2 | 210 | 780 |
| 0 | | Sn (IV) | Cabot SC-2 | 350 | 960 |
| 1.5 | mo | Sn (IV) | Cabot SC-2 | 210 | 730 |
| 2 | mo | Sn (IV) | Cabot SC-2 | 200 | 730 |
| 3 | mo | Sn (IV) | Cabot SC-2 | 160 | 540 |
| 5 | mo | Sn (IV) | Cabot SC-2 | 145 | 420 |
| 6 | mo | Sn (IV) | Cabot SC-2 | 130 | 360 |

Sn (II) = stannous octoate; Sn (IV) = dioctyltindilaurate

EXAMPLE 7

To 200 g of the anionically emulsified polydimethylsiloxane emulsion of Example 1 was added with stirring enough 2N HCl to lower pH of the emulsion to between 5 to 8. Next, stirring was continued while 1.05 of VTM was added dropwise followed immediately by the dropwise addition of 0.70 g of stannous octoate. Stirring was stopped, the container was closed and the emulsion was allowed to remain undisturbed for about 18 hours. Stirring was started and 4 g of AMP was added dropwise followed by the addition of 140 g of Nalco 1115 colloidal silica (poured into the stirred emulsion as a thin stream). This emulsion consisted of emulsion polymer, 0.5 pph Sn (II) octoate, 0.75 pph VTM and 15 pph colloidial silica.

A 20 g portion of the emulsion was transferred to a small vial and it was lightly centrifuged to exclude air bubbles. The emulsion was poured into 2 100 mm diameter plastic Petri dishes and allowed to remain uncovered and undisturbed for 1 week at ambient conditions. Mechanical properties of the resulting elastomeric film were determined. The remainder of the emulsion was stored in a closed container for 6 months at ambient conditions and at 2 months intervals, portions were removed, cast into films and mechanical properties of the resulting films were determined. Results from this shelf age study are given in Table IX.

TABLE IX

| Shelf Age | Tensile Strength | Elongation |
|---|---|---|
| 0 | 420 | 760 |
| 2 months | 400 | 780 |
| 4 months | 430 | 770 |
| 6 months | 450 | 840 |
| 10 months | 430 | 850 |

EXAMPLE 8

To 200 g of the polydimethylsiloxane emulsion of Example 1, having a pH of 8.3, was added 0.70 g of stannous octoate (stannous bis(2-ethylhexanoate)) and the emulsion was stirred for 5 minutes. Next, 1.40 g of methyltris(ethylmethylketoxime)silane (MTO) was added dropwise to the emulsion with stirring. Following addition of the MTO, the emulsion was stirred an additional 3 minutes, the container (one pint jar) was capped and the emulsion was allowed to remain undisturbed for 20 hours at room temperature. Following this period, the emulsion was again stirred while 4 g of 2-amino-2-methyl-1-propanol (AMP) was added dropwise. After all of the AMP was added, stirring was continued while 93 g of the sol of colloidal silica of Example 1 was slowly added to the emulsion in a thin stream. Following addition of the colloidal silica, several drops of an antifoam, Nalco 2311, were added. Stirring was stopped and a portion of the emulsion was transferred to several 2 ounce vials which were then centrifuged lightly to exclude air bubbles in the emulsion. Emulsion was poured into several 100 mm diameter Petri dishes (8 g emulsion per dish) and the dishes were left uncovered and undisturbed for 24 hours. The resulting films were elastomeric and after 1 week of aging, mechanical properties were determined to be: 350 psi ultimate tensile strength, and 850% ultimate elongation.

The total solids content of this emulsion was approximately 50 percent by weight. It consisted of a precured emulsion containing 10 parts of silica per 100 parts of polymer (10 pph silica). In addition, it contained 0.50 pph stannous catalyst and 2 pph MTO, both based on polymer weight.

EXAMPLE 9

This is a comparative example.

To 681.3 g of a hydroxyl endblocked polydimethylsiloxane fluid of a degree of polymerization (DP) of about 35 was added 25 g of a 30% aqueous solution of sodium laurylsulfate and the mixture was stirred while 426 g of aqueous, colIloidal silica (Nalco 1115) having a solids content of 15 percent was slowly added. Next the mixture was homogenized using a laboratory single stage homogenizer at 7500 psi to produce an oil in water emulsion also containing a dispersion of silica. The emulsion was polymerized by adding 5 g of 4N hydrochloric acid and stirring the emulsion for several minutes. The emulsion was allowed to stand undisturbed for 17 hrs at room temperature in a closed container. At the end of this period, the emulsion had thickened to a paste-like consistency, but it had not inverted or coagulated. Polymerization was terminated by adding sufficient 2-amino-2-methyl-propan-1-ol (AMP) with stirring to raise pH of the emulsion to 7.5-9.0. This mixture consisted of an oil in water emulsion of (PDMS) polydimethylsiloxane also containing a dispersion of colloidal silica. PDMS content of this emulsion was approximately 58 percent by weight, silica content was approximately 10 pph (based on weight of PDMS) and total solids content of this mixture was approximately 63 percent.

An attempt to cross-link the above emulsion polymer was made by adding 0.29 g of stannous octoate to a 100 g portion of the emulsion with stirring followed by the addition of 0.45 g of vinyltrimethoxysilane (VTM), also with stirring. Stirring was continued for about 5 minutes after the addition of VTM and the emulsion was allowed to stand undisturbed for 16 hours at room temperature.

A film was cast from this emulsion by pouring 8.0 g of emulsion into a 100 mm dia. plastic petri dish and allowing it to dry under ambient conditions for 20 hours. The resulting film was not elastomeric. Instead, it was polymer thickened with silica. Another film of the same emulsion was cast after allowing the emulsion to stand for 72 hours at room temperature. This film was dried for 16 hours and upon examination, it too was not elastomeric.

To another 100 g portion of the emulsion polymer was added 0.58 g of dibutyltindilaurate followed by 0.45 g of VTM, both with stirring. A small amount of AMP was added, also with stirring, so as to raise pH of the emulsion to about 10. After allowing this mixture to stand undisturbed for 24 hours at room temperature, a film was cast by pouring 8.0 g of emulsion into a 100 mm dia. petri dish. After the film had dried for 20 hours at room temperature it was examined and found to be elastomeric.

EXAMPLE 10

This is a comparative example.

To 200 g of the polydimethylsiloxane emulsion of Example 1, having a pH of 9-10, was added, with stirring, 77.8 g of aqueous, dispersed, fumed silica (Cabot SC-2) having a solids content of 18 percent. Stirring was continued while 0.35 g of stannous octoate (stannous bis(2-ethylhexanoate)) was added and 5 minutes later, 1.05 g of vinyltrimethoxysilane (VTM) was added dropwise. Following addition of VTM, the emulsion was stirred an additional 3 minutes, the container (on pint jar) was capped and the emulsion was allowed to remain undisturbed at room temperature for 2 hours. Following this period, a small portion (10 g) of the emulsion was poured into a Petri dish and the emulsion was allowed to dry at room temperature for about 16 hours. Upon examination, the dried film was not elastomeric. It consisted of thickened polymer.

EXAMPLE 11

To 200 g of an anionically emulsified polydimethylsiloxane emulsion having a solids content of about 70 percent by weight and a pH of about 8.3, the emulsion particles being less than 0.6 micrometers in average diameter and the polymer having a molecular weight average of greater than 240,000, was added 0.70 g of stannous octoate (stannous bis(2-ethylhexanoate)) and the emulsion was stirred for 5 minutes. Next, 1.40 g of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent was added dropwise to the emulsion with stirring. Following addition of the organosilicon hydride, the emulsion was stirred an additional 3 minutes, the container (one pint jar) was capped and the emulsion was allowed to remain undisturbed for 20 hours at room temperature. Hydrogen evolution was noted by a slight pressurization of the container as well as significant bubble formation in the emulsion. The emulsion was again stirred while 4 g of 2-amino-2-methyl-1-propanol (AMP) was added dropwise. After all of the AMP was added, stirring was continued while 93 g of a 15 percent solids (by weight) sol of aqueous, collodial silica (Nalcoag (R) 1115) was slowly added to the emulsion in a thin stream. Following addition of the colloidal silica, several drops of an antifoam, Nalco 2311, were added. Stirring was stopped and a portion of the emulsion was transferred to several 2 ounce vials which were then centrifuged lightly to remove bubbles from the emulsion. Emulsion was poured into several 100 mm diameter Petri dishes (8 g emulsion per dish) and the dishes were left uncovered and undisturbed for 24 hours. The resulting films were elastomeric and after 1 week of aging at ambient conditions, mechanical properties were determined to be 160 pounds per square inch ultimate tensile strength and 480 percent ultimate elongation. The total solids content of this emulsion was approximately 50 percent by weight. It consisted of a precured emulsion containing 10 parts of silica per 100 parts of polymer (10 pph silica). In addition, it contained 0.50 pph stannous catalyst and 1 pph organosilicon hydride crosslinker, both based on polymer weight.

EXAMPLE 12

This is a comparative example.

To 200 g of the emulsion of Example 11 was added 0.70 g of stannous octoate (stannous bis(2-ethylhexanoate)) and the emulsion was stirred for 5 minutes. Next, 1.40 g of 3-(2-aminoethylamino)propyltrimethoxysilane was added dropwise to the emulsion with stirring. Following addition of the aminofunctional silane, the emulsion was stirred an additional 3 minutes, the container (one pint jar) was capped and the emulsion was allowed to remain undisturbed for 20 hours at room temperature. A portion of the emulsion was transferred to a small vial and the vial was centrifuged lightly to remove air bubbles from the emulsion. 10 g of emulsion was poured into a 100 mm diameter Petri dish the dish was left uncovered and undisturbed for 24 hours. The resulting film was not elastomeric, indicating that the emulsion polymer had not been crosslinked. The same experiment was repeated except that 2.8 g of the aminofunctional silane was used. The dried film from this experiment was only very slightly elastomeric and it was extremely tacky. Nalco 1115 colloidal silica was added to this emulsion so as to give an emulsion having 10 parts by weight of (dry) silica per 100 parts of polymer. A film cast from this emulsion and dried for 20 hours was not elastomeric.

The same results were obtained when the experiment was repeated using 4.2 g of the aminofunctional silane as crosslinker. The same results were obtained when 1.4 g of aminopropyltriethoxysilane was used as a crosslinker.

That which is claimed is:

1. An aqueous silicone emulsion having an improved shelf life and which yields an elastomer upon removal of the water at ambient conditions comprising
   (1) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical or 2-(perfluoroalkyl)ethyl radicals having less than 7 carbon atoms per radical, present as an emulsion of dispersed particles in water, the emulsion having a pH of from 4 to 10.5,
   (2) from 0.1 to 1.0 parts by weight of tin (II) (stannous) catalyst,
   (3) from 0.1 to 5 parts by weight of crosslinker selected from the group consisting of (a) silane of the formula $R_aSi(OR')_{4-a}$ where R is hydrogen, monovalent hydrocarbon radical or substituted hydrocarbon radical of from 1 to 6 carbon atoms inclusive, functionalized hydrocarbon radicals, or amine containing radicals, with the proviso that R be chosen such that the crosslinker must be capable of migrating from the aqueous phase into the emulsion micelle of (1), R' is a lower alkyl radical of from 1 to 6 carbon atoms inclusive or a radical of the formula $-N=CR''_2$ where R'' is hydrogen or monovalent hydrocarbon radical of from 1 to 6 carbon atoms inclusive, a is 0 or 1; (b) siloxane having at least 3 reactive groups bonded to silicon per molecule, the reactive group being selected from the group consisting of hydrogen, reactive group of the formula OR' where R' is as defined above, and an amine radical of the formula $-NR''_2$ where R'' is as defined above; and (c) silazane of the formula $R_aSi(NR''_2)_{4-a}$ where R, R'', and a are as defined above, and
   (4) colloidal silica reinforcement,
the emulsion being able to be reinforced with colloidal silica without loss of shelf life, and yielding an elastomer upon removal of the water.

2. The emulsion of claim 1 in which the polydiorganosiloxane has a molecular weight of greater than 200,000.

3. The emulsion of claim 1 in which the amount of (2) is from 0.25 to 1.0 parts by weight.

4. The emulsion of claim 1 in which the tin (II) catalyst (2) is stannous octoate.

5. The emulsion of claim 1 in which the crosslinker (3) is from 0.5 to 2 parts by weight.

6. The emulsion of claim 1 in which the crosslinker (3) is vinyltrimethoxysilane.

7. The emulsion of claim 1 in which the crosslinker (3) is methyltris(ethylmethylketoxime)silane.

8. The emulsion of claim 1 in which the crosslinker (3) is organosiliconhydride.

9. The emulsion of claim 1 in which the tin (II) catalyst is stannous octoate and the crosslinker is vinyltrimethoxysilane.

10. An aqueous silicone emulsion having an improved shelf life and which yields an elastomer upon removal of the water at ambient conditions comprising the product obtained by
   (A) mixing
   (1) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical or 2-(perfluoroalkyl)ethyl radicals having less than 7 carbon atoms per radical, present as an emulsion of dispersed particles in water, the emulsion having a pH of from 4 to 10.5,
   (2) from 0.1 to 1.0 parts by weight of tin (II) (stannous) catalyst,
   (3) from 0.1 to 5 parts by weight of crosslinker selected from the group consisting of (a) silane of the formula $R_aSi(OR')_{4-a}$ where R is hydrogen, monovalent hydrocarbon radical or substituted hydrocarbon radical of from 1 to 6 carbon atoms inclusive, functionalized hydrocarbon radicals, or amine containing radicals, with the proviso that R be chosen such that the crosslinker must be capable of migrating from the aqueous phase into the emulsion micelle of (1), R' is a lower alkyl radical of from 1 to 6 carbon atoms inclusive or a radical of the formula $-N=CR''_2$ where R'' is hydrogen or monovalent hydrocarbon radical of from 1 to 6 carbon atoms inclusive, a is 0 or 1; (b) siloxane having at least 3 reactive groups bonded to silicon per molecule, the reactive group being selected from the group consisting of hydrogen, reactive group of the formla OR' where R' is as defined above, and an amine radical of the formula $-NR''_2$ where R'' is as defined above; and (c) silazane of the formula $R_aSi(NR''_2)_{4-a}$ where R, R'', and a are as defined above, the tin (II) catalyst being added before or simultaneously with the crosslinker, then (B) aging at room temperature for sufficient time to allow crosslinking of the polydiorganosiloxane, then (C) raising the pH of the emulsion to greater than 11 to destroy the activity of the catalyst, to give an emulsion of a polydiorganosiloxane which yields an elastomer upon removal of the water, and which can be reinforced with colloidal silica without loss of shelf life.

11. The emulsion of claim 10 in which there is also added a filler after step (C).

12. The emulsion of claim 11 in which the filler is colloidal silica.

13. A process for producing an aqueous silicone emulsion having an improved shelf life and which yields an elastomer upon removal of the water at ambient conditions consisting essentially of (A) mixing (1) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical or 2-(perfluoroalkyl)ethyl radicals having less than 7 carbon atoms per radical, present as an emulsion of dispersed particles in water, the emulsion having a pH of from 4 to 10.5, (2) from 0.1 to 1.0 parts by weight of tin (II) (stannous) catalyst, (3) from 0.1 to 5 parts by weight of crosslinker selected from the group consisting of (a) silane of the formula $R_a Si(OR')_{4-a}$ where R is hydrogen, monovalent hydrocarbon radical or substituted hydrocarbon radical of from 1 to 6 carbon atoms inclusive, functionalized hydrocarbon radicals, or amine containing radicals, with the proviso that R be chosen such that the crosslinker must be capable of migrating from the aqueous phase into the emulsion micelle of (1), R' is a lower alkyl radical of from 1 to 6 carbon atoms inclusive or a radical of the formula $-N=CR''_2$ where R'' is hydrogen or monovalent hydrocarbon radical of from 1 to 6 carbon atoms inclusive, a is 0 or 1; (b) siloxane having at least 3 reactive groups bonded to silicon per molecule, the reactive group being selected from the group consisting of hydrogen, reactive group of the formula OR' where R' is as defined above, and an amine radical of the formula $-NR''_2$ where R'' is as defined above; and (c) silazane of the formula $R_a Si(NR''_2)_{4-a}$ where R, R'', and a are as defined above, the tin (II) catalyst being added before or simultaneously with the crosslinker, (B) aging at room temperature for sufficient time to allow crosslinking of the polydiorganosiloxane, then (C) raising the pH of the emulsion to greater than 11 to destroy the activity of the catalyst, to give an emulsion of a polydiorganosiloxane which yields an elastomer upon removal of the water, and which can be reinforced with colloidal silica without loss of shelf life.

14. The process of claim 13 in which there is added step (D) addition of filler.

15. The process of claim 14 in which the filler is colloidal silica.

16. The process of claim 13 in which the polydiorganosiloxane has a molecular weight of greater than 200,000.

17. The process of claim 13 in which the amount of (2) is from 0.25 to 1.0 parts by weight.

18. The process of claim 13 in which the tin (II) catalyst (2) is stannous octoate.

19. The process of claim 13 in which the crosslinker (3) is from 0.5 to 2 parts by weight.

20. The process of claim 13 in which the crosslinker (3) is vinyltrimethoxysilane.

21. The process of claim 13 in which the crosslinker (3) is methyltris(ethylmethylketoxime)silane.

* * * * *